Figure 1:
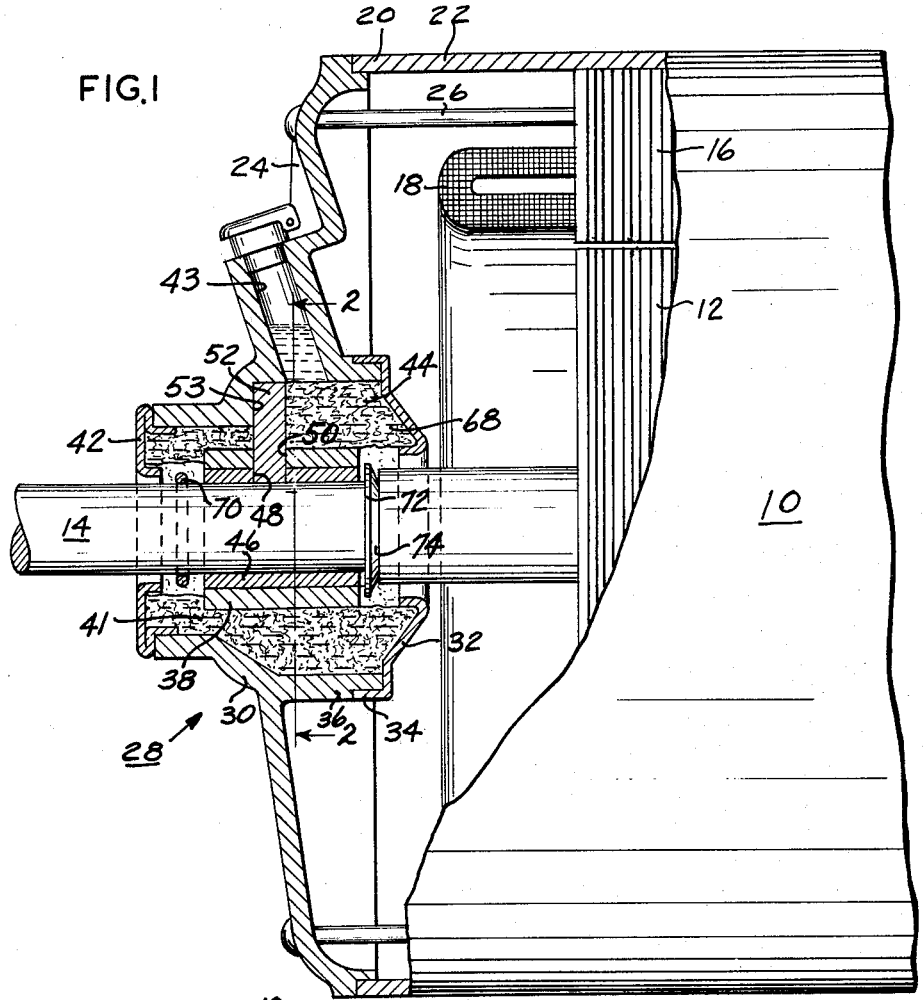

May 18, 1965  A. J. RIDGWAY, JR  3,184,272
LUBRICATING MEANS FOR A ROTATABLE DEVICE
Filed March 28, 1962

INVENTOR.
ASA J. RIDGWAY JR.
BY
Gravely, Lieder & Woodruff
ATTORNEYS.

United States Patent Office 3,184,272
Patented May 18, 1965

3,184,272
LUBRICATING MEANS FOR A ROTATABLE DEVICE
Asa J. Ridgway, Jr., Bellefontaine Neighbors, Mo., assignor to Wagner Electric Corporation, St. Louis, Mo., a corporation of Delaware
Filed Mar. 28, 1962, Ser. No. 183,103
5 Claims. (Cl. 308—132)

This invention relates to lubricating means for a rotatable device and more particularly to improved lubricating means for the bearing of a rotary machine.

In the past in many types of sleeve bearing constructions, conventional absorbent material was inserted into the bearing housing or lubricant reservoir of the machine to retain a liquid lubricant and supply said lubricant to the bearing. The absorbent material, especially in recirculatory lubricating systems, usually included a plurality of special die-cut felt or yarn-type wick members of different predetermined configurations arranged in the bearing housing. By stuffing a sufficient number of absorbent members of this type into the bearing housing and maintaining a portion thereof in engagement with the shaft, adequate bearing lubrication was obtained; however, due to the number of absorbent members and the difficulty of inserting them in the bearing housing, as well as the production and storage of the wick members, manufacturing time and cost of the machines were relatively high.

In order to reduce manufacturing costs, fluid lubricating wicking, which may also be referred to as "self-wicking lubricant," has been used in place of the conventional felt or yarn type wick members, said self-wicking lubricants being commercially available under the tradename "Permawick." Self-wicking lubricants are mixtures of discrete or loose particles or fibers which serve as wicking and a liquid lubricant, for example, one such self-wicking lubricant may be composed of about 85%, by weight, of mineral oil and 15%, by weight, of cellulose base fibers, which fibers are very short in length, about two or three millimeters. Such self-wicking lubricants are flowable and substantially non-separable under pressure so as to be easily and quickly injected under pressure into a bearing housing to completely fill said bearing housing in a single operation and reduce manufacturing costs.

A highly undesirable feature of using such a self-wicking lubricant in relatively high speed rotary devices was that the wicking or fibers thereof were drawn out of the bearing opening by the rotating shaft so that after a period of time the wicking no longer touched the shaft, and this resulted in inadequate lubrication of the bearing since an insufficient amount of liquid lubricant reached the bearing.

It is therefore an object of the present invention to provide an improved lubrication means for a rotatable device which obviates the abovementioned undesirable features.

Another object of the present invention is to provide an economical and highly efficient bearing lubrication means for a rotating device.

Another object is to provide an improved method of forming a lubricating structure for a rotatable member.

Still another object is to provide an improved bearing and lubrication structure therefor employing a self-wicking lubricant.

And still another object is to provide an improved combination of lubricating absorbent materials for use in lubricating sleeve bearings.

These and other objects and advantages will become apparent hereinafter.

Briefly, the invention embodies an absorbent member disposed in a housing of a rotary machine in engagement with the rotatable member thereof, and a self-wicking lubricant disposed in the housing in lubricant transfer relation with said absorbent member.

Figure 2:
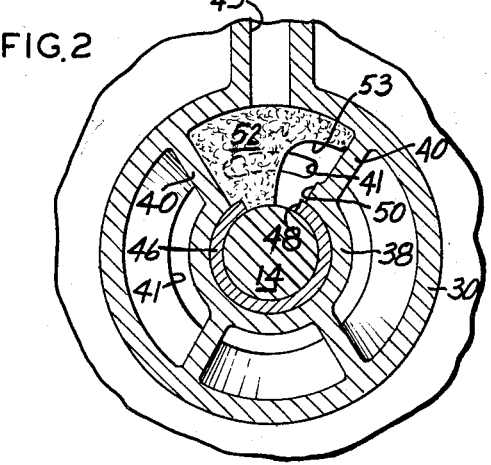
Figure 3:
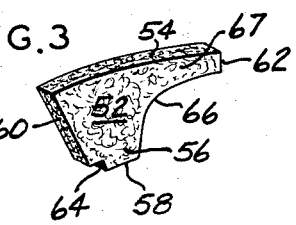

The invention also consists in the parts and arrangement and combination of parts hereinafter described and claimed. In the accompanying drawings which form a part of the specification and wherein like numerals refer to like parts wherever they occur:

FIG. 1 is a partial sectional view of one end of a machine showing a preferred embodiment of the present invention in cross-section, FIG. 2 is a fragmentary view in cross-section taken along the line 2—2 of FIG. 1 but, for clarity, without showing the self-wicking lubricant, and FIG. 3 is a perspective view of an absorbent member shown in FIGS. 1 and 2.

Referring now to FIGS. 1 and 2, there is shown for illustration a dynamoelectric machine, such as an induction motor, generally indicated at 10. Motor 10 is provided with a rotor 12 fixed to a shaft 14 and adapted for rotation within a stator member 16. In the case of an induction motor, the rotor may be of the squirrel-cage type and the stator provided with slots to receive stator windings, such as indicated at 18. Both rotor and stator members are shown made up of a plurality of laminations of magnetic material. The rotor and stator are shown disposed within a motor housing 20 which includes a frame 22 and an end shield 24 engaging one end of the frame. Another end shield (not shown) may engage the other end of frame 22 and the end shields secured to the frame 22 by means of throughbolts 26 which clamp the two end shields against the opposite ends of the frame.

End shield 24 is provided with a bearing housing, indicated generally at 28, which includes an integral annular housing portion 30 and an annular inner end cap 32. End cap 32 has a peripheral flange 34 which tightly engages an inwardly extending annular flange 36 of housing portion 30. A hub 38 of the bearing housing is supported in spaced relation with housing portion 30 by a plurality of ribs or spokes 40. The spokes 40 are shown integral with the hub and housing portion and extend generally radially between the outer surface of the hub and inner surface of the housing portion, as is more clearly seen in FIG. 2. The space between housing portion 30 and hub 38 provide openings at 41 circumferentially disposed between the spokes and provide passages for the flow of liquid lubricant axially from the opposite ends of the bearing. A tightly fitting annular end cap 42 engages the exterior end of the bearing housing portion to prevent liquid lubricant from flowing out of the machine. In order to permit the addition of liquid lubricant to the bearing housing, as may be required from time to time, the end shield is provided with an oil refill passage 43 communicating with the exterior of the shield. The passage 43 is closed at its upper end by a conventional press-fitted oil cup. The bearing housing including housing portion 30 and end caps 32 and 42 form a reservoir of chamber 44 for receiving wicking and liquid lubricant, to be described in detail hereinafter.

Since the material of which the end shield is made is generally not desirable for use as a bearing surface, a bearing sleeve 46 of suitable material is press-fitted into hub 38 to provide a suitable bearing surface for rotatably supporting shaft 14. So that the shaft and inner surface of the bearing are in communication with the reservoir 44, the bearing 46 is provided with a radially extending opening 48 aligned with a slightly larger radial opening 50 in the hub to thus form a passage between the shaft and reservoir for the flow of lubricant to the shaft.

In the preferred embodiment of the present invention, a unitary pre-cut porous member 52 is retained in place in the upper portion of the reservoir and extends through the bearing and hub openings to engage shaft 14. The member 52 may be made from any suitable material which will hold or absorb a liquid lubricant and supply or meter the flow of lubricant to the shaft. In the drawing, the member 52 is indicated as a wick made of felt, such as wool felt, and cut to a shape which conforms generally to the space between the upper two spokes 40 in the bearing housing. The housing portion 30 is provided with a radially extending flat wall portion 53 which is engaged by one side of the felt member for locating the felt member when it is inserted into the housing. Preferably, the wick member 52 is made slightly oversize in relation to the space it is to occupy in the bearing housing, whereby it can be wedged in the housing and remain there during operation, and without the use of a holding clamp or spring. The wick member may be oil soaked before being placed in the bearing housing.

Referring also to FIG. 3, the felt wick member 52 is shown with an upper surface 54 which engages the inner surface of bearing housing portion 30 and a lower extending portion 56 having a bottom surface 58 which engages shaft 14. Opposite side wall portions 60 and 62 of the felt member are slanted so that they respectively engage the facing sides of the upper two spokes 40. A notch 64 is formed in the felt member so that a portion thereof engages a small outer surface area of the bearing adjacent the bearing opening 48 to aid in maintaining the felt member in position. A side wall portion 66 of the felt member extends from the bottom surface 58 to the side wall portion 62 to define a relatively narrow end portion 67. The felt member 52 is shown in FIG. 3 with a substantially straight or only slightly curved upper surface 54, and this surface is preferably made slightly longer than the accurate distance along the inner surface of the housing portion 30 between the upper two spokes 40. With this configuration, the felt member, when it is inserted in place in the bearing housing, will bend along side wall portion 66 so that the lower portion 56 will be resiliently urged into good contact engagement with shaft 14 due to the inherent resiliency of the felt member. In this way, the felt member 52 is grippingly secured in place in the bearing housing.

A self-wicking lubricant 68 is shown in FIG. 1 filling the reservoir 44 an in lubricant transfer relation with the felt member 52. The self-wicking lubricant 68, as previously described herein, is a mixture of loose particles or fibers forming a suitable wicking and liquid lubricant, the mixture being flowable and substantially non-separable when under pressure.

After the felt member 52 is placed in the bearing housing, and before the end shield is attached to the machine, the self-wicking lubricant is introduced into the bearing housing. While there are a number of specific methods of introducing a self-wicking lubricant into a bearing housing, one well known method is to employ a hydraulic pressure system (not shown) for injecting the self-wicking lubricant under pressure into said bearing housing. This may be done by fitting a dummy shaft, similar to shaft 14, into the bearing with the dummy shaft provided with a passage connected exteriorly to a supply tank of self-wicking lubricant and interiorly with the bearing opening portion not closed by the absorbent member 52. With the ends of the bearing housing substantially closed, such as by use of molds or plugs, the self-wicking lubricant is injected under pressure through the dummy shaft passage into the bearing housing to substantially entirely fill the housing. After removing the injecting apparatus, the end shield is ready for connection to the machine.

The self-wicking lubricant 68 contacts both sides of wick member 52 and fills the space under wall portion 66 of the wick member so that it is in good lubricant transferring relation with the wick member. The self-wicking lubricant also fills the opening 48 and 50, and it is preferred that the self-wicking lubricant be in lubricant transferring engagement with the shaft 14; however, since the wick member 52 will remain in lubricant transferring engagement between the self-wicking lubricant and the shaft 14, as previously mentioned, it is not manifest that the self-wicking lubricant engage the shaft 14. In fact, rotation of the shaft 14, in some instances, serves to displace the self-wicking mixture from lubricant transferring engagement therewith.

In some cases where it is desired to provide a wick member which completely closes the bearing opening, such as opening 48, the self-wicking lubricant may be injected under pressure into the reservoir 44 into lubricant transfer relation with such wick member by closing the opposite ends of the reservoir and introducing the self-wicking lubricant through the oil-refill passage 43.

The absorbent felt member 52, being fixed in place, remains in contact engagement with the shaft 14 to absorb oil from the self-wicking lubricant and supply it to the shaft. The fibers of the self-wicking lubricant 68 adhere to each other in the oil to form an absorbent oil filled mass of material conforming to the shape of the reservoir 44 as seen in FIG. 1. While the oil, of course, flows from the mixture 68 to the bearing during operation, the wicking or mass of fibers of the mixture remains substantially stationary to perform its wicking function.

The bearing lubrication system shown in the drawing is a recirculatory type system. During operation of the motor, oil is delivered to the rotating shaft 14 from the absorbent member 52 and flows along the shaft and inner surface of the bearing. An oil slinger 70, shown as a resilient ring, is disposed on the shaft for rotation therewith, and serves to throw oil flowing along shaft 14 from one end of the bearing back into the self-wicking lubricant 68 in the reservoir. Another slinger 72, shown as a conventional snap ring, is disposed on the shaft for rotation therewith for throwing oil which flows from the other end of the bearing back into the self-wicking lubricant. Shaft 14 is also provided with a groove 74 for returning any oil reaching the groove back into the reservoir to prevent it from reaching the relatively rotatable members of the motor. Thus, during rotation of shaft 14, oil circulates through the lubricating system by flowing from the absorbent felt member 52 in the reservoir to the shaft, out the ends of the bearing and back to the mass of wicking in the reservoir where it is absorbed by member 52.

The present lubricating structure provides an absorbent member 52 cut from conventional absorbent material, such as wool felt, having fibers firmly held together or interconnected due to the composition or method of manufacture of said absorbent member. The absorbent member 52 is predeterminately positioned in the opening 48 of the bearing 46 in engagement with the rotating shaft 14, and the fibers of said absorbent member are not drawn out of said bearing opening by the rotating movement of said shaft; however, as previously mentioned the self-wicking lubricant may be displaced by shaft rotation from lubricant transferring engagement with said shaft. In view of the above, it is obvious that the lubrication structure embodied in the present invention insures adequate and positive transfer of oil from the self-wicking lubricant for shaft and bearing lubrication purposes and incorporates the reduced manufacturing costs inherent with the use of a self-wicking lubricant.

It is now apparent that a novel lubricating structure meeting the objects set out hereinbefore is provided, and that changes and modifications in the disclosure may be made by those skilled in the art without departing from the spirit of the invention as defined by the claims which follow.

What I claimed is:

1. In a device including a bearing housing having wall portions defining a lubricant reservoir, a sleeve bearing connected in said housing and having a bearing surface therein, a lubricant access aperture extending through said bearing and connecting said bearing surface with said reservoir, and a shaft rotatably received in said bearing on said bearing surface, the combination therewith comprising a resilient wick member positioned in said housing with a portion thereof in said reservoir and another portion thereof in said aperture in direct engagement with said shaft for transferring liquid lubricant thereto from said reservoir, said wick member engaging and being partially compressed between a wall portion of said reservoir and said shaft to prevent displacement movement thereof, and a lubricating mixture substantially filling the remaining portion of said reservoir in lubricant transfer relation with said wick member for supplying liquid lubricant to said shaft through said wick member including a liquid lubricant and cellulose base fibers flowable and substantially non-separable when flowing under pressure.

2. Lubrication means for a device comprising a bearing housing, means including said housing defining a lubricant reservoir, support means connected with said housing and extending into said reservoir, bearing mounting means on said support means and having a sleeve bearing therein, a shaft extending through said reservoir and journalled in said sleeve bearing, a wick chamber having opposed side walls defined in said support means and connecting with said reservoir, aperture means extending through said support means and sleeve bearing and connected with said chamber, a resilient absorbent wick member positioned in said chamber and having a portion in said aperture means extending into direct lubricant transfer relation with said shaft, said absorbent wick member being deformed upon placement in said chamber into compression engagement with the opposed side walls of said chamber, said compression engagement being the sole means for maintaining said wick member against displacement from said chamber and from engagement with said shaft, and a lubricating mixture including a liquid lubricant and cellulose base fibers adapted to be flowable and substantially non-separable when flowing under pressure, said lubricating mixture substantially completely filling said reservoir and being in lubricant transfer relation with said absorbent wick member to transfer liquid lubricant thereto for lubricating said shaft.

3. Lubricating means for a device comprising a bearing housing having walls defining a lubricant reservoir, bearing support means in said reservoir including bearing mounting means and a pair of generally radially extending and circumferentially spaced structural ribs connecting said mounting means to said housing, a sleeve bearing disposed in said mounting means and having an annular bearing surface, said mounting means and said bearing having interconnecting aperture means therethrough connecting said bearing surface with said reservoir, a rotatable shaft journalled on said bearing surface, a resilient pre-cut felt wick member disposed in said reservoir between said ribs with a portion thereof extending through said aperture means for engagement with said shaft to supply liquid lubricant from said reservoir to said shaft, said wick member being positioned in compressive engagement with said ribs, a wall of said reservoir, and said shaft and being firmly held in its position solely by said compression engagement, and a lubricating mixture substantially filling the remaining portion of said reservoir in lubricant transfer relation with said wick member for supplying liquid lubricant to said shaft through said wick member and including a liquid lubricant and cellulose base fibers flowable and substantially non-separable when flowing under pressure.

4. In a device having a bearing housing defining a lubricant reservoir, a sleeve bearing in said housing and having a lubricant access aperture therethrough connecting with said reservoir and a shaft rotatably received in said bearing, the combination therewith comprising a resilient absorbent wick member predeterminately positioned in said reservoir and in a portion of said aperture against displacement therefrom and in direct engagement with said shaft, and a lubricating mixture including a liquid lubricant and cellulose base fibers flowable and substantially non-separable when flowing under pressure, said lubricating mixture substantially filling said reservoir and said aperture in lubricant transfer engagement with said shaft and said wick member and being subject to displacement from lubricant transfer engagement with said shaft upon rotation thereof, and said absorbent wick member serving to transfer liquid lubricant from said lubricating mixture to said shaft to insure lubrication thereof in the event of the displacement of said lubricating mixture from lubricant transfer engagement with said shaft upon rotation thereof.

5. Lubricating means for a device comprising a bearing housing having wall portions defining an axially extending lubricant reservoir, bearing supporting means in said reservoir having opposed radially extending walls defining with a wall portion of said reservoir a wick chamber in said reservoir, a sleeve bearing supported by said bearing supporting means and having an annular bearing surface therein, lubricant access aperture means extending through said bearing and connecting said bearing surface with said reservoir, a rotatable shaft journalled on said bearing surface, a resilient wick member positioned in said wick chamber and extending into a portion of said aperture means into engagement with said shaft for transferring liquid lubricant thereto from said reservoir, said wick member being in compressed engagement with wall portions of the said wick chamber against displacement therefrom, and a lubricating mixture including a liquid lubricant and cellulose base fibers flowable and substantially non-separable when flowing under pressure, said lubricating mixture completely filling said reservoir and aperture means and being in lubricant transfer engagement with said wick member and said shaft and being subject to displacement from lubricant transfer engagement with said shaft upon rotation thereof, and said wick member serving to transfer liquid lubricant from said lubricating mixture to said shaft to insure lubrication thereof in the event of the displacement of said lubricating mixture from lubricant transfer engagement with said shaft upon rotation thereof.

References Cited by the Examiner
UNITED STATES PATENTS

| | | | |
|---|---|---|---|
| 2,350,854 | 6/44 | Whiteley | 29—149.5 |
| 2,492,775 | 12/49 | Willits | 308—132 |
| 2,503,021 | 4/50 | Bennett | 308—132 |
| 2,522,985 | 9/50 | Bradley | 308—132 |
| 2,728,134 | 12/55 | Haller | 29—149.5 |
| 2,966,459 | 12/60 | Abel | 308—240 |
| 3,030,157 | 4/62 | Dederick | 308—132 |

FRANK SUSKO, *Primary Examiner.*